J. J. MEYER.
VALVE.
APPLICATION FILED MAR. 7, 1912.
1,044,408.
Patented Nov. 12, 1912.
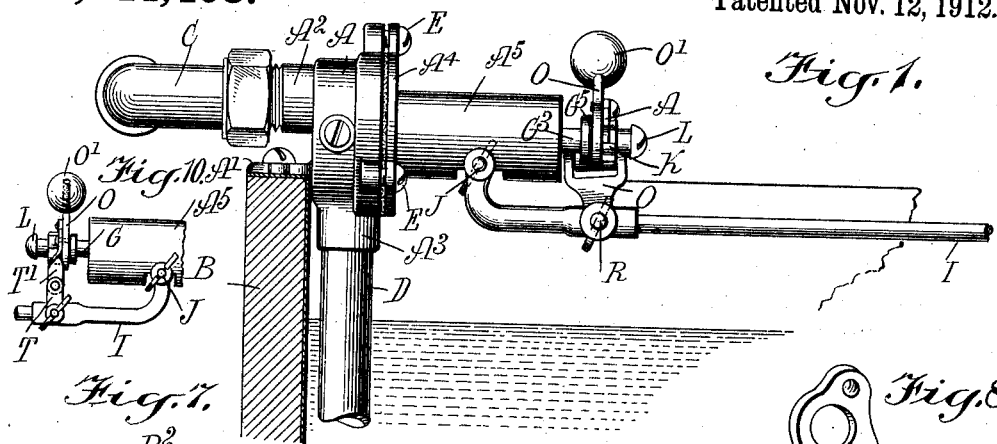
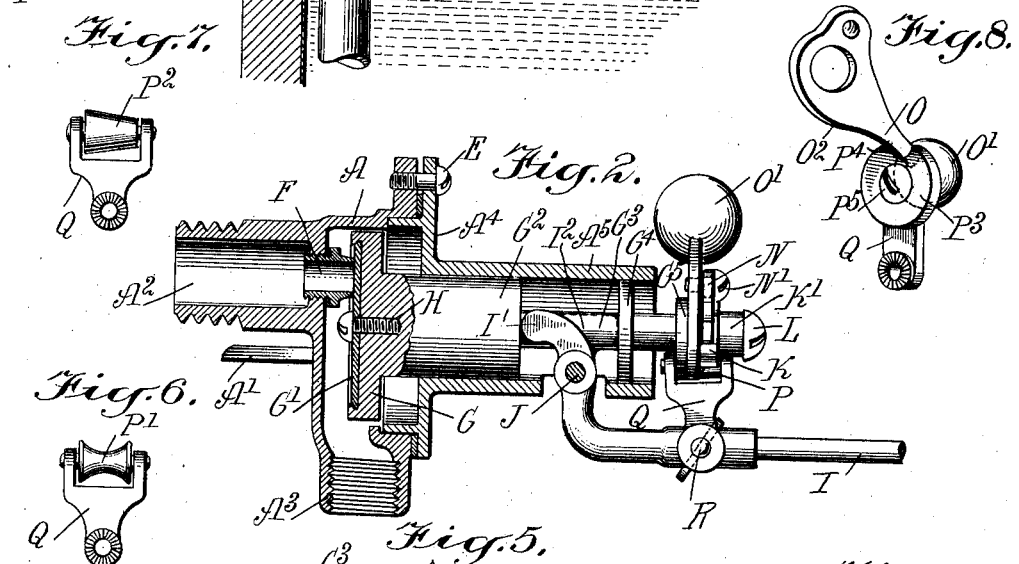
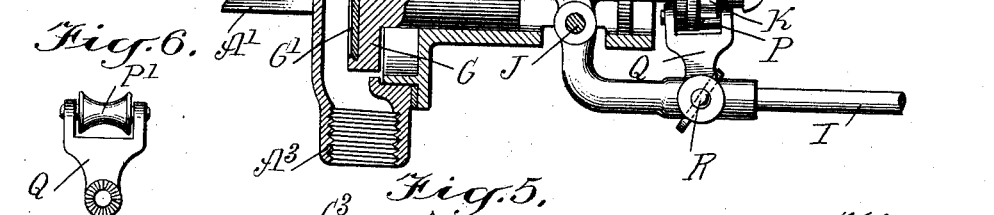
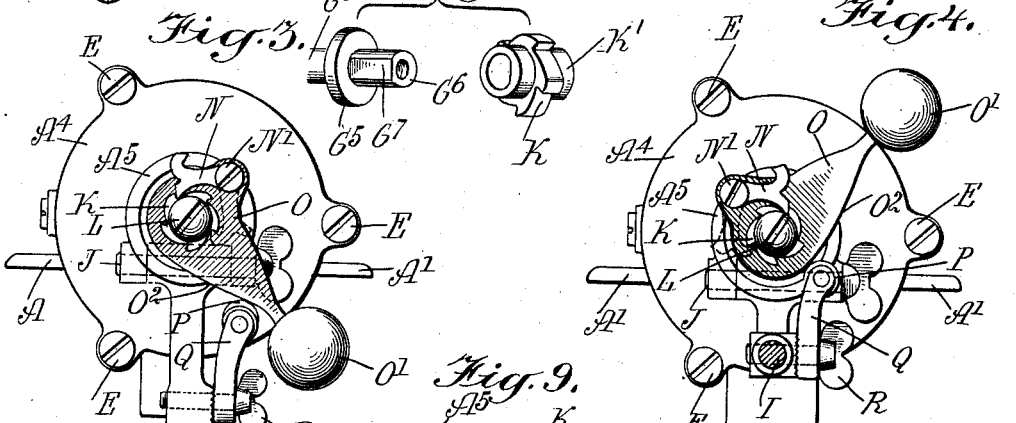
WITNESSES
INVENTOR
John J. Meyer
BY Munn & Co
ATTORNEYS
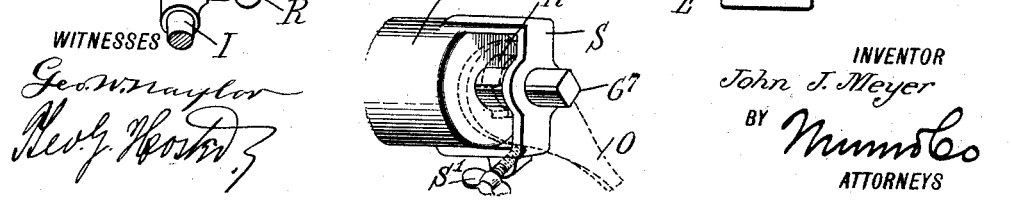

UNITED STATES PATENT OFFICE.

JOHN J. MEYER, OF YONKERS, NEW YORK.

VALVE.

1,044,408.  Specification of Letters Patent.  Patented Nov. 12, 1912.

Application filed March 7, 1912. Serial No. 682,095.

*To all whom it may concern:*

Be it known that I, JOHN J. MEYER, a citizen of the United States, and a resident of Yonkers, in the county of Westchester and State of New York, have invented a new and Improved Valve, of which the following is a full, clear, and exact description.

The invention relates to valves or ball cocks for use in flushing tanks and similar devices, and such, for instance, as shown and described in the Letters Patent of the United States No. 998,543, granted to me on July 18, 1911.

The object of the present invention is to provide a new and improved valve or ball cock arranged to insure an easy opening and closing of the valve, to present a different portion of the surface of the valve disk for contact with the valve seat at each operation, and to insure long life of the valve, also to prolong the period of repairing or rewashering thereof and to prevent waste of water by leakage.

For the purpose mentioned use is made of a valve disk adapted to be moved forward or backward, to or from the valve seat and adapted to be turned during either the forward or backward movement on the rise or fall of the float in the tank.

A practical embodiment of the invention is represented in the accompanying drawings forming a part of this specification, in which similar characters of reference indicate corresponding parts in all the views.

Figure 1 is a side elevation of the valve arranged as a float-controlled supply valve for the top of a flushing tank; Fig. 2 is a sectional side elevation of the same; Fig. 3 is an end view of the same; Fig. 4 is a similar view of the same with parts in a different position; Fig. 5 is a perspective view of the ratchet wheel and stem detached one from the other; Fig. 6 is a face view of the actuating arm on the float lever; Fig. 7 is a similar view of a modified form of the same; Fig. 8 is a perspective view of another modified form of the same and shown in conjunction with the cam lever; Fig. 9 is a perspective view of a modified form of the outer end of the casing, and Fig. 10 is a side elevation of a modified form of the connection between the float lever and the actuating lever for the pawl and ratchet mechanism.

A valve body $A$, preferably of cylindrical shape, is provided with exterior lugs or flanges $A'$ for attaching the valve body to the flushing tank $B$ or other device, and the said valve body $A$ is provided with an inlet $A^2$ connected by a pipe $C$ with a source of water supply. The valve body $A$ is also provided with an outlet $A^3$ engaged by a pipe $D$ extending into the tank $B$ to supply the latter with water. The valve body $A$ at its inner end has a head $A^4$ fastened in place by a fastening device $E$, and from the head $A^4$ extends a tubular bearing $A^5$, as plainly shown in the drawings.

Within the valve body $A$ and connected with the inlet $A^2$ is arranged a valve seat $F$ adapted to be engaged by a washer or a facing $G'$ of a valve disk $G$ provided with a stem $G^2$ mounted to slide and to turn in the tubular bearing $A^5$. The washer or facing $G'$ is preferably provided with a beveled edge engaging a corresponding seat on the face of the valve disk $G$, and the middle of the washer $G'$ is fastened in place by a screw $H$ screwing into the disk $G$. By reference to Fig. 2 it will be noticed that the valve seat $F$ is eccentric relative to the valve disk $G$ and when the device is in use and the valve disk is turned then the face of the valve disk presents a new surface to the seat $F$.

In order to impart a sliding motion to the valve disk $G$, the following arrangement is made: The valve stem $G^2$ is provided with a reduced portion $G^3$ on which is arranged a collar $G^4$ mounted to slide in the bearing $A^5$, and the face of the valve stem $G^2$ at the reduced portion $G^3$ is engaged by the head $I'$ of a float-controlled lever $I$ mounted to swing on a pivot pin $J$ extending transversely and carried by the bearing $A^5$. The lever $I$ is provided with a rearwardly-extending lug $I^2$ adapted to engage the inner face of the collar $G^4$ so that when the lever $I$ swings upward on the float rising in the tank $B$ then the head $I'$ pushes the stem $G^2$ and the valve disk $G$ inwardly so that the washer $G'$ finally engages the seat $F$ and closes the same to stop the inflow of water to the tank $B$. When the water is withdrawn from the tank $B$ and the float falls then the lever $I$ swings downward and in doing so the lug $I^2$ pushes against the collar $G^4$ to move the stem $G^2$ and the valve disk $G$ in an outward direction to open the valve seat $F$ and allow water to flow into the tank B. It is understood that the pressure of the water against the washer G' aids the disk G in its outward movement.

In order to impart a turning motion to the valve disk G the following arrangement is made: The reduced portion $G^3$ of the valve stem $G^2$ is provided with a collar $G^5$ outside of the bearing $A^5$, and the terminal $G^6$ of the reduced portion $G^3$ of the valve stem $G^2$ is provided with a flattened part $G^7$, and on this terminal $G^6$ fits the hub K' of a ratchet wheel K held on the terminal $G^6$ by a screw L screwing in the terminal $G^6$, as plainly indicated in the drawings, it being understood that the inner end of the hub K' of the ratchet wheel K abuts against the collar $G^5$. The hub K' projects equidistantly from the faces of the ratchet wheel K so that the latter can be placed in reverse position on the terminal $G^6$ to allow of turning the disk G either during its movement toward the seat F or during its movement from the said seat. The ratchet wheel K is adapted to be engaged by a double or a reversible pawl N mounted to swing on a stud bolt N' screwing on a lever O mounted to swing on that portion of the hub K' abutting against the collar $G^5$ at the time. The lever O is provided at its outer end with a weight O' and the lower or bottom edge $O^2$ of this lever O is in the form of a long cam surface and rests on a roller P journaled in an arm Q fastened by a bolt R to the float lever I as plainly indicated in the drawings. The roller P may be of various forms, that is, it may be of cylindrical shape, as shown in Figs. 1, 2, 3 and 4, or in the form of a grooved roller P', as shown in Fig. 6, or in the form of a conical roller $P^2$, as illustrated in Fig. 7, or in the form of a wheel $P^3$ provided in its peripheral face with a notch $P^4$ engaged by the lever O, it being understood that this wheel $P^3$ is free to turn on its pivot $P^5$ to insure an easy riding of the lever O in the notch $P^4$ during the up and down swinging motion of the float lever I.

It is understood that when the ratchet wheel K is reversed, the pawl N is likewise reversed, but the lever O and the arm Q remain in their proper relative positions to cause a turning of the ratchet wheel K during either the upward movement or the downward movement of the float-controlled lever I according to the mounting of the ratchet wheel and pawl. It is understood that whenever the ratchet wheel K is turned the disk G is turned with it owing to the connection of the ratchet wheel K with the terminal $G^6$ of the reduced portion $G^3$ of the stem $G^2$. As previously stated, the turning of the disk G can be accomplished during either the inward or outward movement of the disk by correspondingly changing the ratchet wheel K and the pawl N. It is further understood that the pawl N is made double so that it can be used either for pushing the ratchet wheel around or for pulling it around as desired.

In some cases it may be desirable to limit the swinging motion of the lever O, and for this purpose the bearing $A^5$ may be provided at its outer end with a limiting bracket S for limiting the swinging motion of the lever O, the latter and the ratchet wheel working intermediate the end of the bearing $A^5$ and the bracket S and the ratchet wheel being free to slide on the polygonal terminal $G^6$ of the reduced portion $G^3$ of the stem $G^2$, as indicated in dotted lines in Fig. 9.

By providing the cam lever O with an irregular cam surface $O^2$, a considerable swinging motion is given to the said lever O to insure proper turning of the valve disk G at each operation.

It will also be noted that in case the pawl N should fall over then the hook end thereof will engage the ratchet teeth and pull the ratchet wheel around instead of pushing it, see dotted lines in Figs. 3 and 4.

In the modified form shown in Fig. 10, the float lever I is connected with the actuating lever O for the pawl and ratchet mechanism by an articulated connection consisting of an arm T secured to the float lever I and a link T' pivotally connecting the arm T with the actuating lever O so that when the float lever I swings up or down a like swinging motion is given to the actuating lever O. The downward swinging motion of the lever O can be limited by a set screw S' or other means on the bracket S, so that the float lever I can swing farther down after the lever O has come to rest on the set screw.

The valve shown and described is very simple in construction, and the disk G is turned a short distance at each operation so as to present a different portion of the surface of the washer G' to the seat F to insure long life to the valve and likewise prolong the period of repairing and rewashering the valve. It will further be seen that the turning mechanism of the disk G is arranged outside of the bearing $A^5$ so that access is had to such turning mechanism at any time for repairs or other purposes.

When the ratchet wheel K is turned during the downward movement of the float lever I the actuating lever O with its weight O' has sufficient force to turn the ratchet wheel K and with it the valve disk G; that is, during the outward sliding movement of the valve disk G the latter is also turned by the action of the weighted lever O, pawl N and ratchet wheel K.

It is understood that when the valve disk G is turned during the downward swinging motion of the actuating lever O the weight O' thereof is sufficiently heavy to turn the valve disk, and on account of the valve disk G moving longitudinally while being turned the latter action is rendered easy as the movement of the valve disk and its stem is spirally.

Having thus described my invention, I claim as new and desire to secure by Letters Patent:

1. A valve, comprising a valve body, a valve seat in the said body, a valve disk adapted to engage the said seat and having a valve stem mounted to turn and to slide in the said body, a float lever engaging the said valve stem for moving the same in the direction of its axis, and a ratchet wheel and pawl mechanism controlled from the said float lever and mounted on the said valve stem for turning the said stem.

2. A valve, comprising a valve body, a valve seat in the said body, a valve disk adapted to engage the said seat and having a valve stem mounted to turn and to slide in the said body, a float lever engaging the said valve stem for moving the same in the direction of its axis, and a reversible pawl and ratchet mechanism controlled from the said float lever and connected with the said valve stem for imparting a turning motion to the said stem and the valve disk during either the forward or the backward movement of the valve disk and its stem according to the mounting of the said pawl and ratchet.

3. A valve, comprising a valve body, a valve seat in the said body, a valve disk adapted to engage the said seat and having a valve stem mounted to turn and to slide in the said body, a float lever engaging the said valve stem for moving the same in the direction of its axis, an actuating lever mounted on the said valve stem and adapted to be controlled by the said float lever, a pawl carried by the said actuating lever, and a ratchet wheel on the said valve stem and engaged by the said pawl for turning the stem.

4. A valve, comprising a valve body, a valve seat in the said body, a valve disk adapted to engage the said seat and having a valve stem mounted to turn and to slide in the said body, a float lever engaging the said valve stem for moving the same in the direction of its axis, a ratchet wheel on the said valve stem, a pawl engaging the said ratchet wheel, an actuating lever carrying the said pawl and mounted to swing on the said valve stem, and a connection between the said float lever and the said actuating lever to impart a swinging motion to the actuating lever from the said float lever.

5. A valve, comprising a valve body, a valve seat in the said body, a valve disk having a valve stem and adapted to engage the said seat, a float lever connected with the said valve stem to move the valve disk toward and from the said valve seat, a pawl and ratchet mechanism connected with the said valve stem for turning the latter, and comprising a weighted actuating lever fulcrumed on the said valve stem and controlled by the said float lever, the said actuating lever carrying the pawl to turn the said valve disk during its movement away from the said valve seat.

6. A valve, comprising a valve body, a valve seat in the said body, a valve disk adapted to engage the said seat and having a valve stem mounted to turn and to slide in the said body, a float lever engaging the said valve stem for moving the same in the direction of its axis, an arm on the said float lever and provided with a roller, an actuating lever mounted to swing loosely on the said valve stem and resting on the said friction roller, a pawl fulcrumed on the said actuating lever, and a ratchet wheel on the said valve stem and engaged by the said pawl.

7. A valve, comprising a valve body, a valve seat in the said body, a valve disk adapted to engage the said seat and having a valve stem mounted to turn and to slide in the said body, a float lever engaging the said valve stem for moving the same in the direction of its axis, an arm on the said float lever and provided with a roller, an actuating lever mounted to swing loosely on the said valve stem and resting on the said friction roller, a reversible pawl fulcrumed on the said actuating lever, and a reversible ratchet wheel engaged by the said pawl and held on the said valve stem.

In testimony whereof I have signed my name to this specification in the presence of two subscribing witnesses.

JOHN J. MEYER.

Witnesses:
 THEO. G. HOSTER,
 PHILIP D. ROLLHAUS.

Copies of this patent may be obtained for five cents each, by addressing the "Commissioner of Patents, Washington, D. C."